J. PRICE.
Shackle for Platform Springs of Wagons.
No. 74,591. Patented Feb. 18, 1868.
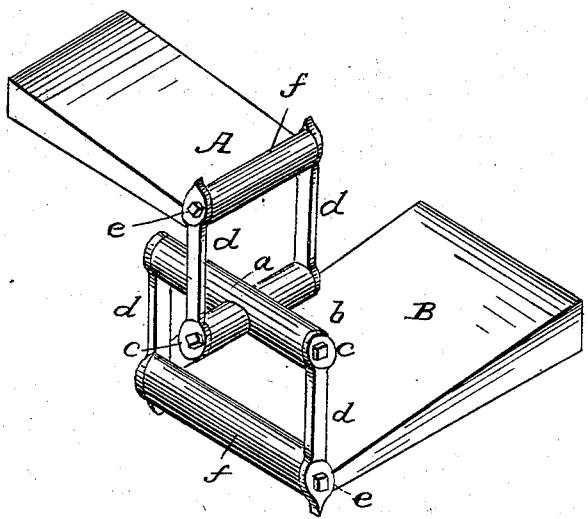

United States Patent Office.

JOHN PRICE, OF NEW YORK, N. Y.

Letters Patent No. 74,591, dated February 18, 1868.

IMPROVEMENT IN SHACKLES FOR PLATFORM-SPRINGS OF WAGONS.

The Schedule referred to in these Letters Patent and making part of the same.

TO ALL WHOM IT MAY CONCERN:

Be it known that I, JOHN PRICE, of the city, county, and State of New York, have invented a new and improved Shackle for the Platform-Springs of Wagons; and I do hereby declare that the following is a full, clear, and exact description thereof, which will enable others skilled in the art to make and use the same, reference being had to the accompanying drawing, forming part of this specification.

This invention relates to a new and improved shackle or joint, by which the ends of the several parts comprising what are generally termed platform-springs are connected together. The parts of these springs are at present connected by shackles or joints, which do not admit of any horizontal play of the latter, and the springs are, consequently, subjected to considerable strain and injury, the leaves of each part being frequently disengaged from the ribs which keep them in place.

My invention is designed to obviate this difficulty by constructing a more flexible joint than hitherto, as hereinafter fully shown and described.

The accompanying drawing is a perspective view of my invention.

A B represent the connected ends of two parts of a platform-spring, there being four parts in all, as is well known. The ends of the parts A B are connected by a shackle or joint, composed of two tubes, $a\ b$, crossing each other centrally at right angles, and forged permanently together. Through each tube $a$, a bolt, $c$, passes longitudinally, one tube being slightly above the plane of the other, so that the bolts may pass through without interfering or coming in contact with each other. The bolts $c$ secure one end of arms or links $d$ to each end of each tube $a\ b$, and the opposite ends of these arms or links have bolts $e$ passing through them and through eyes $f$, formed by turning or rolling over the ends of A B.

By this mode of construction it will be seen that the shackle has four joints formed by the four bolts $c\ c\ e\ e$, and the four links, $d$ which constitute a universal joint, which admits of a horizontal play or movement of the parts A B, and preserves the spring from any undue strain.

The shackles are at present constructed of solid rods crossing each other, like the tubes $a\ b$, and welded together, and have their ends bent at right angles, through which the bolts $e$ pass to secure the ends of the parts A B. The only joints, therefore, in the ordinary shackle, are thus formed by the bolts $e\ e$, the links $d$ not being used. Hence it will be seen that there can be no horizontal play of the parts A B, and the spring, consequently, will be subjected to much strain, and quite liable to get out of order.

Having described my invention, what I claim as new, and desire to secure by Letters Patent, is—

A shackle for connecting the ends of the parts of platform-springs, composed of the cross-tubes $a\ b$, and the bolts $c\ c\ e\ e$, all constructed and applied substantially in the manner as and for the purpose herein specified.

JOHN PRICE.

Witnesses:
WM. F. MCNAMARA,
ALEX. F. ROBERTS.